Figure 1:
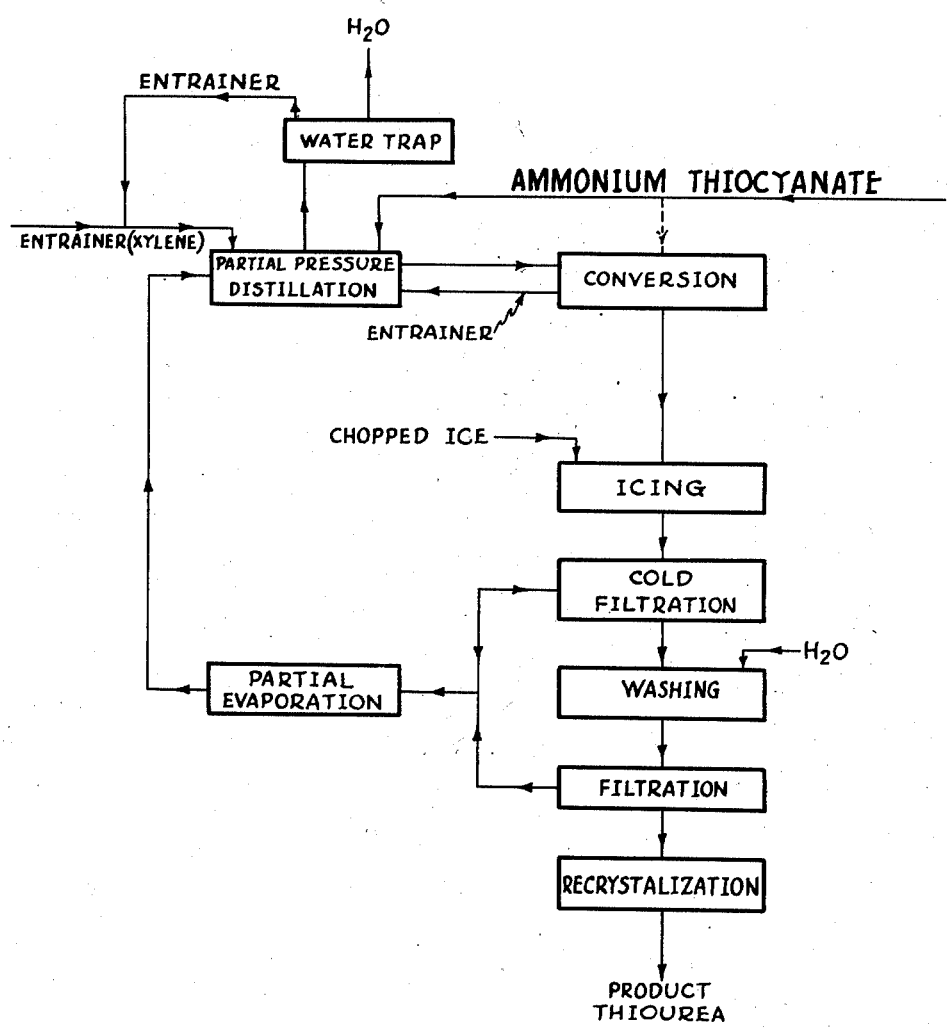
Figure 2:
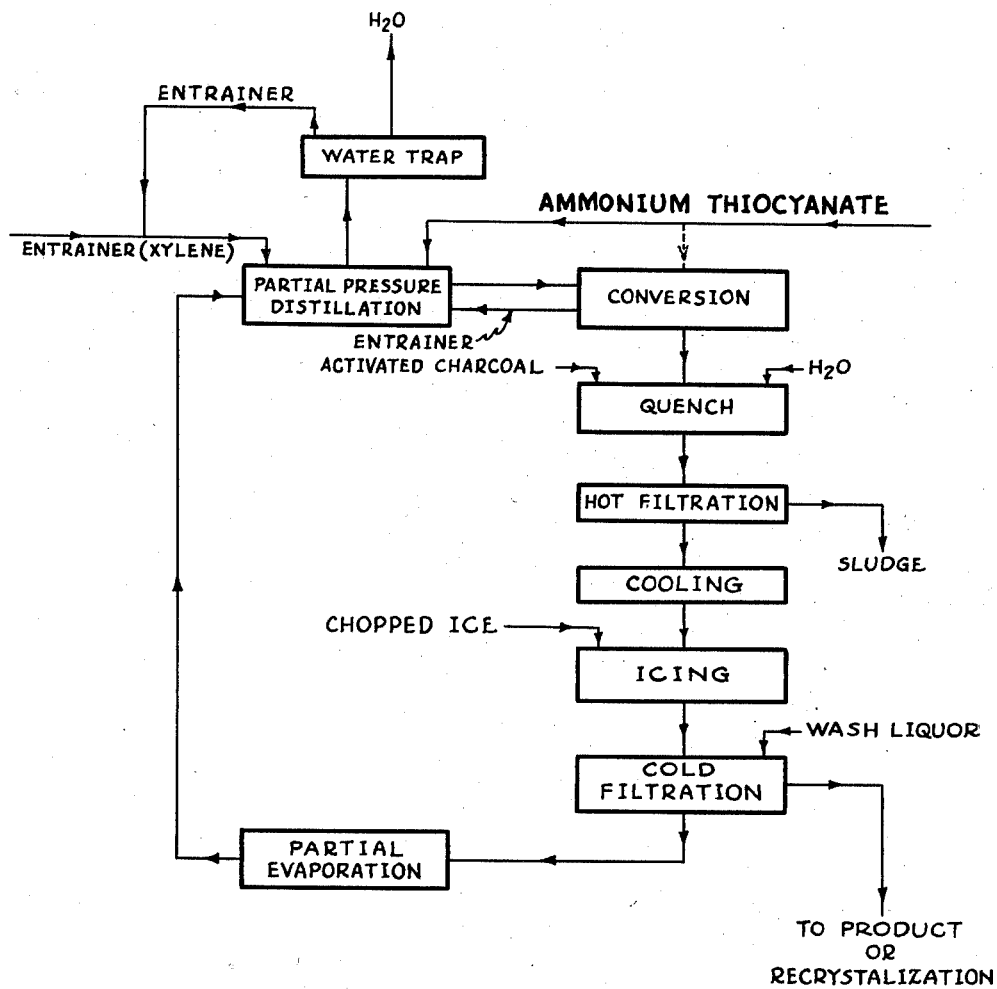

May 15, 1951 R. E. POWERS 2,552,584
PREPARATION OF THIOUREA
Filed Oct. 2, 1947 2 Sheets—Sheet 1

Inventor
ROBERT E. POWERS.
By George T Johnson
his Attorney

Patented May 15, 1951

2,552,584

UNITED STATES PATENT OFFICE 2,552,584

PREPARATION OF THIOUREA

Robert E. Powers, Pittsburgh, Pa., assignor to Koppers Company, Inc., Pittsburgh, Pa., a corporation of Delaware Application October 2, 1947, Serial No. 777,479

14 Claims. (Cl. 260—552)

This invention relates to the manufacture of thiourea from ammonium thiocyanate and is particularly directed to new and improved methods of recovering thiourea from admixture with unconverted ammonium thiocyanate.

The present invention has for its objects to provide improved processes for manufacturing thiourea by the thermal conversion of ammonium thiocyanate; to improve the recovery of thiourea in such processes; to provide new and effective processes for the aqueous extraction of the conversion mixture; to minimize the amount of thiourea which must be recycled in the process; to avoid the disadvantages of the prior art and to obtain advantages as will be pointed out or as will become apparent; and in general to obtain higher yields of thiourea and/or greater economy per unit yield of thiourea. Further objects will appear as the description proceeds.

In the manufacture of thiourea by the thermal conversion of ammonium thiocyanate, a conversion mixture containing approximately 25% thiourea can be obtained without difficulty. If the conversion is conducted with the proper precautions as will be described, but which in themselves do not constitute the invention, a conversion mixture relatively free of products other than ammonium thiocyanate and thiourea can be obtained. It is a purpose of this invention to instruct those skilled in the art how to obtain thiourea from such conversion mixtures in a facile and economical manner.

Ammonium thiocyanate, which preferably, has been thoroughly dried, preferably in the manner which will be described, is heated as required to convert a substantial portion of it to thiourea. The amount which is thus converted to thiourea will depend upon the equilibrium conditions obtaining for the particular conditions of the conversion and upon the time allowed for approach to equilibrium and ordinarily will be in the order of 25% thiourea. Those skilled in the art are well informed as to this conversion, and the details and instructions need not be given here except to say that it is suitable to heat the dry ammonium thiocyanate to a temperature above its melting point and below about 155° C. until it is melted and then to lower the temperature to below 145° C., but still keeping it above the melting point of the mixture and to continue heating at this temperature until a satisfactory degree of conversion is obtained. Ordinarily the heating may be continued up to 8 or 10 hours exclusive of the melting period, which ordinarily should not take more than 1 or 2 hours. The purpose of these particular conditions is to minimize decomposition losses by keeping the temperature as low as practical considering if the temperature is too low, the time required to obtain a near-equilibrium conversion is unnecessarily prolonged. The reason that the temperature can be lowered after the melting period is that sufficient thiourea will have been formed by then to lower the melting point of the mixture sufficiently to permit the lower temperature. Under these conditions if the ammonium thiocyanate has been properly dried it is possible to obtain 25% conversion without untoward formation of undesirable by-products such as guanidine thiocyanate.

In order to avoid formation of by-product impurities in the drying of the ammonium thiocyanate, the raw ammonium thiocyanate and the ammonium thiocyanate solutions by-product of the aqueous extraction, are dehydrated according to the processes described in the co-pending application of John Mitchell and myself, filed of even date hereof, and a copending application of Wojciech Swietoslawski, Serial Number 696,871, filed September 13, 1946, now abandoned. Briefly, these dehydration processes involve evaporation of the water under the partial pressure of an entrainer, at least over the latter stages of the dehydration. For example, as illustrated in the drawings, the mother liquors and wash liquors are concentrated by evaporation, preferably in vacuo until about 80% of the water has been evaporated and thereafter evaporation is continued in the presence of xylene or like entrainer until the ammonium thiocyanate is completely dehydrated. The aqueous solution from the partial evaporation, for example, may be dispersed in xylene from which dispersion vapors of the entrainer and water are removed to a condenser and thence to a water trap where the entrainer and water are separated and the entrainer is returned continuously to the partial pressure evaporation.

The dehydrated ammonium thiocyanate now is subjected to conversion after the manner noted above. It is advantageous to effect this conversion without separating the xylene, and if the conversion is thus carried out without agitation other than that due to convection, except during the melting when a solid phase is present, very little decomposition, as evidenced by evolution of ammonia and carbon disulphide, is obtained.

The conversion mixture thus obtained, or a like conversion mixture obtained in any suitable manner, is now worked up by the processes of the present invention in order to effect recovery of the thiourea. The conversion mix is extracted with water under conditions such that at least the last and major proportion of the water is obtained by melting of ice in contact with undissolved salt and the solid and liquid phases are separated substantially at the temperature obtained on the melting of the ice. A slurry of solute (ammonium thiocyanate and thiourea) containing a substantial proportion of the ammonium thiocyanate as solid is first formed from a minor portion of the water. The slurry is then cooled by melting of the ice and the solute is simultaneously extracted by the liquid water so formed. The conversion mix may be dissolved in a minor proportion of the water and cooled as required to provide a slurry of solute containing a substantial proportion of the ammonium thiocyanate in the solid phase, or the hot conversion melt may be added directly to an amount of ice which constitutes the entire quantity of water required so that the formation of the slurry, the cooling and extracting steps are automatically and continuously carried out. However, formed, it is preferred that the water content and temperature of the slurry be so correlated that the bulk of the ammonium thiocyanate is either transformed to the solid phase or stays in the solid phase. This results inherently when all the water is originally present as ice.

For efficient recovery of thiourea, the amount of water should be carefully proportioned to the amount of the conversion mixture. The broad limits are defined on the low side by the mechanics of the process (sufficient water must be utilized to provide slurries which may be readily handled in the apparatus available) and on the high side by the saturation concentration of the conversion mix at the temperature of separation (there must be some solids present in order to effect separation). Any quantity of water within these limits will produce thiourea, though with varying quality and in varying yields according to the amount of water used.

For optimum results the amount of water should be such that at the temperature of the separation, the liquid phase is at or near the theoretical ammonium thiocyanate saturation concentration; that is to say, at a concentration such that the solution would be saturated with ammonium thiocyanate if all the ammonium thiocyanate were dissolved. Preferably, the solution should be unsaturated with respect to ammonium thiocyanate at the temperature of the separation up to the point of actual separation of the solid and liquid phases so that ammonium thiocyanate may be continuously extracted from the solid solute in the slurry. Ordinarily, it will be sufficient to use between about 7 and 11 parts of water for every 10 parts of conversion mixture. This includes all the water added up to the separation, whether as liquid water, wash liquors, or chopped ice. More or less may be used, but in general, for the same temperature of separation, with larger amounts the yield of thiourea is cut down and with smaller amounts the thiourea is contaminated with an unduly large amount of ammonium thiocyanate and the recovery of ammonium thiocyanate is impaired. Optimum conditions appear to be obtained with about 8 parts of water for each 10 parts of conversion mixture. This approximates the ammonium thiocyanate saturation concentration for $-10°$ C. In other words, the proportion is such that the final temperature is substantially at the saturation temperature for ammonium thiocyanate.

It will be understood that any quantity of ice may be used as long as the separation is effected substantially at the ammonium thiocyanate saturation temperature. Any excess ice will simply be filtered off in the separation step.

It has been proposed heretofore to effect separation of ammonium thiocyanate and thiourea in the conversion mixtures by dissolving the mixture in water and cooling the resulting solution to a temperature between $-10°$ C. and $-20°$ C. While in the processes of the present invention like temperatures are obtained, the manner in which the temperature is obtained is distinctly different and the results flowing therefrom are new and unexpected. When ice is added to a slurry of solute constituted as above described, the temperature is rapidly lowered by the combined effects of the negative heat of solution of ammonium thiocyanate and the negative heat of fusion of ice. Two opposed physical processes are involved; the one, cooling, tending to supersaturate the solution, and the other, diluting, tending to desupersaturate it, or more properly speaking, to prevent it from becoming saturated. The latter process evidently dominates since, during the icing, ammonium thiocyanate is transferred from the solid phase to the liquid phase. The effect is as if the slurry were cooled rapidly with the continuous addition of water as required to keep the solution unsaturated with respect to ammonium thiocyanate, and, as a matter of fact, in the broader aspects of the invention, it should be possible to obtain applicant's results by cooling in this manner without utilizing ice. The net result is that instead of ammonium thiocyanate being precipitated out, as in the prior art, it is being continuously extracted from the solid phase into the solution. It is believed that the combined effects of these two processes may explain, at least in part, the new and improved results obtained by the present invention. While in the broader aspects of the invention, the conversion mix, or more properly speaking, the slurry formed therefrom, may be cooled in any suitable manner accompanied by the simultaneous and gradual addition of the requisite amount of water, I have found it most expedient and economical to effect the cooling and diluting simultaneously and automatically by the direct contact of the solid solute in the slurry with ice.

Thus, in carrying out the invention I find it expedient to add sufficient water either in the liquid or solid (ice) form to form a slurry containing a substantial proportion of the ammonium thiocyanate in the solid phase. Where ice is used, melting from contact with the hot conversion mix provides the requisite liquid for a slurry which inherently contains the bulk of the ammonium thiocyanate. Where liquid water is used, the amount can be so correlated with the temperature that the bulk of the ammonium thiocyanate will be in the solid phase. The slurry, however formed, but preferably with the bulk of the ammonium thiocyanate in the solid phase, is then treated with chopped ice in the amount calculated to produce as low a temperature as possible without dissolving too much of the solid solute. When all the water is added as ice at one time the formation of the slurry, the cooling and the extraction of the solid phase merge into one continuous process. However carried out, the effect of icing the slurry is to dissolve out ammonium thiocyanate without disproportionately dissolving out thiourea, so that on separation a filter cake is obtained containing the bulk of the thiourea and only a relatively small proportion of the ammonium thiocyanate.

The invention may be more fully understood by the reference to the accompanying drawing in which Figure I is a flow sheet illustrating one form of the invention, and Figure II is a flow sheet illustrating another form of the invention. Parts given herein are by weight unless otherwise specified.

According to the procedure illustrated in Figure I, raw ammonium thiocyanate and a concentrated solution of ammonium thiocyanate recycled from the process are first subjected to dehydration. The recycled solution is concentrated preferably in vacuo until the bulk of the water, say, about 80%, is evaporated and the concentrated solution plus the raw ammonium thiocyanate, which also could be added before the concentration if desired, is subjected to partial pressure evaporation in which vapors of an entrainer, e. g. xylene, and water are taken overhead to a condenser and a suitable water trap which operates to remove the water and to return the entrainer to the partial pressure evaporation. Optimum conditions for this partial pressure evaporation have already been amply described. On completion of the partial pressure evaporation the slurry of crystals of ammonium thiocyanate, which by the way contains some thiourea due to recycling, is subjected to conversion. The partial pressure evaporation and conversion suitably may be carried out in the same reactor.

The conversion is now carried out under a layer of xylene under the conditions already described in detail. On completion of the conversion the xylene is evaporated off and returned to the partial pressure evaporation and the conversion mix is treated for the recovery of thiourea.

The conversion mix thus obtained is poured, while still in the molten state, directly into a mass of chopped ice, the quantity of which has been figured to give an ammonium thiocyanate saturation temperature between about $-10°$ C. and $-20°$ C. The mixture of ice and conversion mixture is stirred until substantially all of the ice has melted and possibly for a short time thereafter and while the temperature is still substantially at the temperature which obtains on the melting of the ice, the slurry is subjected to a suitable cold filtration effected either on a centrifuge or on a suitable filter. The liquid phase, which contains the bulk of the ammonium thiocyanate, is withdrawn to the partial pressure evaporation and the filter cake is washed. Suitably the latter may be effected by repulping the filter cake in a suitable quantity of cold water and/or crushed ice and then filtering the slurry obtained. The wash water is passed on to the partial evaporation and the filter cake is recovered as such or passed to recrystallization.

In a typical procedure according to the process illustrated in flow sheet of Figure I, 1063 parts of conversion melt containing 25% thiourea at a temperature of 142° C. is poured into 818 parts of chopped ice with stirring. The stirring is continued until all of the ice is dissolved whereupon a temperature of $-10°$ C. is obtained. The slurry thus obtained is filtered at that temperature on a centrifuge. The filter cake should contain at least 67% thiourea on the dry basis and account for 79% or more of the conversion mixture thiourea.

Instead of pouring the hot conversion melt directly into chopped ice, it may be poured (quenched) directly into a limited quantity of water as illustrated in the flow sheet of Figure II. The amount of water should be limited to a minimum consistent with complete or substantially complete dissolution of the conversion mix at or near the boiling point of the solution and consistent with obtaining a slurry sufficiently fluid for handling on cooling to between about 25° C. and 0° C. Of the water required to be added, both in the quench and in the icing steps, only a minor amount, preferably not in excess of about 40% should be added in the quench. On cooling of the solution thus obtained to between room temperature and about 0° C., a pasty slurry is obtained. The solid phase which exists in this slurry is not unlike that obtained by the pouring of the molten conversion mixture directly into chopped ice in that it contains the bulk of the ammonium thiocyanate and in that ammonium thiocyanate can be leached therefrom by cooling in contact with chopped ice. The process is completed by mixing into the pasty slurry a quantity of chopped ice representing the balance of the required water. The total quantity of water added as quench and as chopped ice suitably is adjusted to give an ammonium thiocyanate saturation temperature in the order of the temperature which obtains on the melting of the ice. The stirring is continued until all or substantially all of the ice is melted and possibly a short time thereafter, and separation is effected substantially at the temperature which obtains.

The total quantity of water required is proportioned between the quenching step and the icing step so that at least 50% of the water is added as ice. The more that can be added in this manner the lower is the ultimate temperature which can be reached in the icing step. However, it is essential that sufficient water be added in the quenching step completely, or substantially completely, to dissolve all of the conversion mix and to provide, on cooling to the temperature at which icing is begun, a paste which is sufficiently plastic or fluid that the chopped ice may be intimately mixed therewith without difficulty. In practice, entirely satisfactory results are obtained if 40% of the total water required is added in the quenching step and the balance is added as chopped ice in the icing step.

In the cooling step, which precedes the icing, the solution is cooled down to about 15° C. and preferably below. The lower the temperature to which the solution (or paste as it will appear when cooled) is cooled in this step, the lower the temperature which may be reached in the icing step. For practical purposes, however, it is not expedient to cool below about 15° C. On cooling to this temperature and icing with the remaining 60% of the total required water, a temperature from $-10$ to $-20°$ C. is easily obtainable depending upon the heat losses during the operation. This temperature is higher than the ternary eutectic but is low enough to give entirely satisfactory yield of thiourea.

In carrying out the process in accordance with flow sheet of Figure II a typical procedure is to pour 1063 parts of conversion mixture containing 25% thiourea while at a temperature of 142° C. into 327 parts water. The solution thus obtained is boiled with 20 parts of activated carbon and filtered while hot. The filtrate is then cooled to 15° C. whereupon 491 parts of crushed ice is stirred in. After all the ice is melted, the slurry obtained is filtered at a temperature of about $-10°$ C. The filter cake thus obtained should contain 80 to 86% thiourea on the dry basis and should account for at least 79% of the total thiourea of the conversion mix.

While I have described my invention with reference to particular embodiments thereof, it will be understood that variation may be made therein without departing from the spirit and scope of the invention as set forth above and in the appended claims.

I claim:

1. In the manufacture of thiourea by the thermal conversion of ammonium thiocyanate, the method of recovering thiourea from the conversion mixture which comprises extracting the conversion mixture with water, of which at least the last and major proportion is obtained by the melting of ice in contact with undissolved solute containing a substantial proportion of the ammonium thiocyanate of the conversion mixture whereby the solution formed by the extraction is continuously and gradually diluted by the liquid water formed by the melting of the ice the amount of water thus freed by the melting ice being insufficient to dissolve all of said solute and separating the undissolved solute from the liquid.

2. The method of claim 1 in which substantially all of the water used to extract the conversion mixture is initially in the form of ice and the conversion mixture is brought into contact therewith while still in the molten state.

3. The method of claim 2 in which the amount of water is proportioned to the amount of conversion mixture to give a liquid phase at the separation temperature substantially at the theoretical ammonium thiocyanate saturation concentration.

4. The method of claim 1 in which the amount of water is proportioned to the amount of conversion mixture to give a liquid phase at the separation temperature substantially at the theoretical ammonium thiocyanate saturation concentration.

5. The method of claim 4 in which the amount of water is between about 7 and 11 parts for every 10 parts of conversion mixture.

6. The method of claim 1 in which the amount of water is between about 7 and 11 parts for every 10 parts of conversion mixture.

7. In the manufacture of thiourea by the thermal conversion of ammonium thiocyanate, the method of recovering thiourea from the conversion mixture which comprises extracting the conversion mixture with water, a minor proportion of which is utilized to prepare a slurry and at least a major proportion of which is admixed with said slurry as ice, allowing said ice to melt in contact with said slurry and then separating undissolved solute of said slurry from the liquid.

8. In the manufacture of thiourea by the thermal conversion of ammonium thiocyanate, the method of recovering thiourea from the conversion mixture which comprises preparing a slurry from the conversion mixture with a minor proportion of water such that the bulk of the ammonium thiocyanate is in the solid phase, bringing the solid phase of the slurry into contact with ice, allowing said ice to melt in contact with said slurry, and then effecting the separation of the solid phase from the liquid phase substantially at the ammonium thiocyanate saturation temperature.

9. In the manufacture of thiourea by the thermal conversion of ammonium thiocyanate, the method of recovering thiourea from the conversion mixture which comprises mixing the molten conversion mixture with chopped ice, allowing said ice to melt in contact with the solidified conversion mixture and separating the solid phase from the liquid phase substantially at the ammonium thiocyanate saturation temperature.

10. The process of claim 8 in which more than half of the required water is added as ice.

11. The process of claim 9 in which the amount of ice is between about 7 and 11 parts for each 10 parts of conversion mixture.

12. In the manufacture of thiourea by the thermal conversion of ammonium thiocyanate, the method of recovering thiourea from the conversion mixture which comprises preparing a slurry of conversion mixture in an amount of liquid water such that the major portion of the ammonium thiocyanate is in the solid state, cooling said slurry while continuously adding liquid water as required to keep the solution unsaturated with respect to ammonium thiocyanate and then effecting a separation of the liquid and solid phases, the total amount of liquid water being such that at the temperature of the separation the liquid phase is substantially at the theoretical ammonium thiocyanate saturation concentration.

13. The method of claim 12 in which the total amount of liquid water is between about 7 and 11 parts for every 10 parts of conversion mixture.

14. The method of claim 13 in which more than half the total water is added simultaneously with the cooling.

ROBERT E. POWERS.

REFERENCES CITED

The following references are of record in the file of this patent:

UNITED STATES PATENTS

| Number | Name | Date |
|---|---|---|
| 1,949,738 | Donauer | Mar. 6, 1934 |